United States Patent
Christians

(10) Patent No.: US 10,253,651 B2
(45) Date of Patent: Apr. 9, 2019

(54) TURBOMACHINE FLOW CONTROL DEVICE

(75) Inventor: Joseph T. Christians, Vernon, CT (US)

(73) Assignee: United Technologies Corporation, Farmington, CT (US)

(*) Notice: Subject to any disclaimer, the term of this patent is extended or adjusted under 35 U.S.C. 154(b) by 1132 days.

(21) Appl. No.: 13/523,175

(22) Filed: Jun. 14, 2012

(65) Prior Publication Data
US 2013/0336759 A1    Dec. 19, 2013

(51) Int. Cl.
*F01D 25/30* (2006.01)
*F02K 3/10* (2006.01)
*F02K 1/82* (2006.01)

(52) U.S. Cl.
CPC ........... *F01D 25/30* (2013.01); *F01D 25/305* (2013.01); *F02K 1/822* (2013.01); *F02K 3/10* (2013.01); *Y02T 50/675* (2013.01)

(58) Field of Classification Search
CPC ...... F01D 17/41; F01D 17/141; F01D 17/143; F01D 17/145; F01D 17/148; F01D 25/30; F01D 25/305; F05D 2260/606; F05D 2270/051; F05D 2270/3062; F02K 1/82; F02K 1/822; F02K 3/025
See application file for complete search history.

(56) References Cited

U.S. PATENT DOCUMENTS

| | | | |
|---|---|---|---|
| 3,712,062 A | 1/1973 | Nash | |
| 3,826,088 A | 7/1974 | Nash et al. | |
| 3,866,417 A * | 2/1975 | Velegol | F02K 1/82 60/266 |
| 4,064,692 A * | 12/1977 | Johnson | F02K 3/075 60/762 |
| 4,072,008 A | 2/1978 | Kenworthy et al. | |
| 4,242,871 A | 1/1981 | Breton | |
| 4,285,194 A | 8/1981 | Nash | |
| 4,718,230 A | 1/1988 | Honeycutt, Jr. et al. | |
| 4,817,378 A * | 4/1989 | Giffin, III | F02K 1/386 60/262 |
| 4,833,881 A | 5/1989 | Vdoviak et al. | |
| 4,848,081 A | 7/1989 | Kennedy | |
| 4,958,489 A | 9/1990 | Simmons | |
| 5,144,795 A * | 9/1992 | Field | F02K 1/822 239/127.3 |
| 5,209,059 A | 5/1993 | Ward | |

(Continued)

OTHER PUBLICATIONS

International Search Report and Written Opinion for International Application No. PCT/US2013/042422 completed on Jul. 24, 2013.

(Continued)

*Primary Examiner* — Christopher Verdier
*Assistant Examiner* — Jason G Davis
(74) *Attorney, Agent, or Firm* — Carlson, Gaskey & Olds, P.C.

(57) ABSTRACT

An exemplary flow control device assembly for a turbomachine includes a flow control device configured to move between a first position and a second position. The flow control device in the first position forces more flow through a plurality of cooling holes than the flow control device in the second position. The plurality of cooling holes are upstream the flow control device relative a direction of flow through the turbomachine.

20 Claims, 3 Drawing Sheets

(56) References Cited

U.S. PATENT DOCUMENTS

| | | | |
|---|---|---|---|
| 5,230,214 A | | 7/1993 | Pechette |
| 5,307,624 A | * | 5/1994 | Even-Nur et al. ........... 60/226.3 |
| 5,417,056 A | | 5/1995 | Johnson et al. |
| 5,813,221 A | | 9/1998 | Geiser et al. |
| 5,899,058 A | * | 5/1999 | Narcus .................. F01D 17/105 60/226.3 |
| 7,013,635 B2 | | 3/2006 | Cohen et al. |
| 2007/0157621 A1 | * | 7/2007 | Koshoffer ............... F02K 1/386 60/773 |
| 2008/0110176 A1 | | 5/2008 | Bunel et al. |
| 2009/0178383 A1 | | 7/2009 | Murphy et al. |

OTHER PUBLICATIONS

International Preliminary Report on Patentability for International Application No. PCT/US2013/042422 mailed Dec. 24, 2014.
European Search Report for Application No. 13803491.3 dated Jul. 3, 2015.

* cited by examiner

TURBOMACHINE FLOW CONTROL DEVICE

BACKGROUND

This disclosure relates generally to a flow control device and, more particularly, to a turbomachine flow control device having a reduced signature.

Some turbomachines include modulated exhaust flow control devices, especially turbomachines incorporating augmentors. The modulated exhaust flow control devices move between positions that force more air through exhaust cooling passages and positions that force less air through the exhaust cooling passages. Forcing more air through the exhaust cooling passages complicates the path the air must travel before being exhausted from the turbomachine. Reducing the air moving through the exhaust cooling passages can increase thrust, fuel efficiency, or both. More air is typically forced through the exhaust cooling passages when the turbomachine is operating in an augmented mode.

Tied liners are an example of exhaust cooling passages. The modulated exhaust flow control devices are a type of flow control device. Radar detection devices may detect these modulated exhaust flow control devices.

SUMMARY

A flow control device assembly for a turbomachine according to an exemplary embodiment of the present disclosure includes, among other things, a flow control device configured to move between a first position and a second position. The flow control device in the first position forces more flow through a plurality of cooling holes than the flow control device in the second position. The plurality of cooling holes are upstream the flow control device relative to a direction of flow through the turbomachine.

In a further non-limiting embodiment of the foregoing flow control device assembly, the flow control device in the first position may block more flow through an exit of a bypass flow path than the flow control device in the second position.

In a further non-limiting embodiment of either of foregoing flow control device assemblies, the flow control device may be positioned axially closer to an aft end of an exhaust duct than a forward end of the exhaust duct.

In a further non-limiting embodiment of any of foregoing flow control device assemblies, the flow control device may be positioned radially between the exhaust duct and an outer case of the turbomachine when moving between the first and second positions.

In a further non-limiting embodiment of any of foregoing flow control device assemblies, the plurality of cooling holes may be in a exhaust duct, and the plurality of cooling holes may all be upstream the flow control device relative to a direction of flow through the turbomachine.

In a further non-limiting embodiment of any of foregoing flow control device assemblies, the flow control device may be axially spaced from a turbine exhaust case of the turbomachine.

In a further non-limiting embodiment of any of foregoing flow control device assemblies, the flow control device may be axially spaced from an axially rearmost vane of an exhaust section of the turbomachine.

In a further non-limiting embodiment of any of foregoing flow control device assemblies, the flow control device may be moveable to positions between the first position and the second position.

A turbomachine assembly according to another exemplary embodiment of the present disclosure includes, among other things, an exhaust duct extending axially from an exhaust section of a turbomachine. The exhaust duct has a plurality of cooling holes. A flow control device is at an aft end of the exhaust duct. The flow control device is configured to move between a first position and a second position. The flow control device in the first position causes more air to move through the cooling holes than the flow control device in the second position.

In a further non-limiting embodiment of the foregoing turbomachine assembly, the flow control device may be spaced from an axially rearmost vane of an exhaust section of the turbomachine.

In a further non-limiting embodiment of either of the foregoing turbomachine assemblies, the flow control device is positioned radially between the exhaust duct and an outer case of the turbomachine.

In a further non-limiting embodiment of any of the foregoing turbomachine assemblies, the plurality of cooling holes are all upstream the flow control device relative to a direction of flow through the turbomachine.

In a further non-limiting embodiment of any of the foregoing turbomachine assemblies, the flow control device is axially spaced from a turbine exhaust case of the turbomachine.

A method of selectively directing flow through cooling holes of a tied exhaust duct according to another aspect of the present disclosure includes moving a flow control device from a first position to a second position to direct more flow through cooling holes of an exhaust duct. The cooling holes are upstream the flow control device.

In a further non-limiting embodiment of the foregoing method of selectively directing flow through cooling holes, the method may move the flow control device from the first position to the second position to block flow.

In a further non-limiting embodiment of either of the foregoing methods of selectively directing flow through cooling holes, the flow control device may be located within an aftmost portion of a bypass flowpath of a turbomachine having the exhaust duct.

DESCRIPTION OF THE FIGURES

The various features and advantages of the disclosed examples will become apparent to those skilled in the art from the detailed description. The figures that accompany the detailed description can be briefly described as follows:

FIG. 3 shows a close up view of a portion of the turbomachine of FIG. 2.

DETAILED DESCRIPTION

Figure 1:
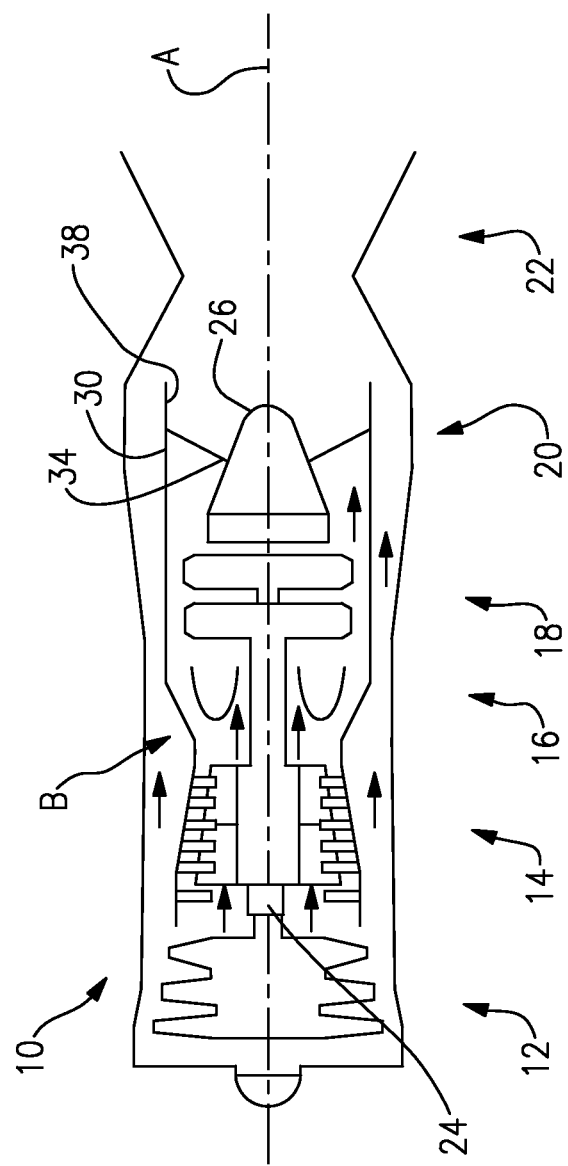
FIG. 1 shows a section view of an example turbomachine.
Figure 2:
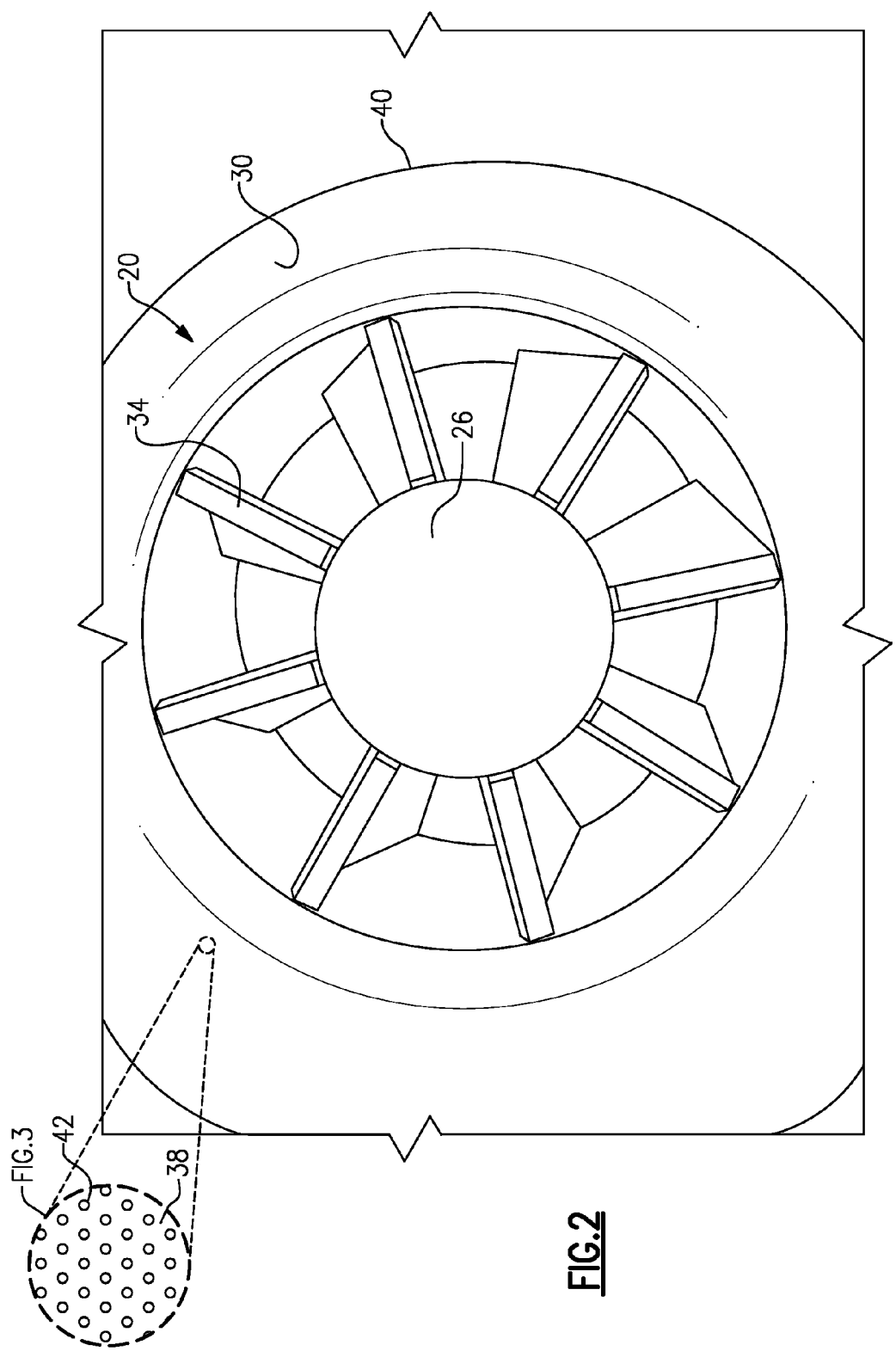
FIG. 2 shows an aft end view of the turbomachine of FIG. 1.

Referring to FIGS. 1 to 3, a gas turbine engine 10 is an example type of turbomachine. The engine 10 includes a fan section 12, a compressor section 14, a combustor section 16, a turbine section 18, a turbine exhaust case 20, and an exhaust nozzle section 22. The compressor section 14, combustor section 16, and turbine section 18 are generally referred to as the core engine. The turbine exhaust case 20 forms a portion of an augmentor for the engine 10. An axis A extends longitudinally through the engine 10.

Although depicted as a two-spool gas turbine engine in the disclosed non-limiting embodiment, it should be understood that the concepts described herein are not limited to use with such two-spool designs. That is, the teachings may be applied to other types of turbomachines and gas turbine engines, including three-spool architectures.

In some examples, the engine 10 may incorporate a geared architecture 24 that allows a fan of the fan section 12 to rotate at a slower speed than a turbine that is driving the fan. The geared architecture 24 may include an epicyclic geartrain, such as a planetary geartrain, or some other gear system.

In the example engine 10, flow moves from the fan section 12 to a bypass flowpath B. Flow from the bypass flowpath B through the exhaust nozzle section 22 generates forward thrust. The compressor section 14 drives flow along a core flowpath. Compressed air from the compressor section 14 communicates through the combustor section 16. The products of combustion expand through the turbine section 18.

The turbine exhaust case 20 of the example engine 10 includes an inner case 26, an outer case 30, and an annular array of vanes 34 extending radially therebetween. The vanes 34 are the axially rearmost vanes 34 in the turbine exhaust case 20. The vanes 34 are film cooled in this example using cooling air that has moved radially through the vanes 34 from the inner case 26, which comprises a cooled tailcone in this example.

The vanes 34 each house a fuel spraybar and flameholders. These devices also form portions of the augmentor for the engine 10. The spraybar supports a plurality of fuel injector assemblies at varied radial positions. When the augmentor is on, fuel sprays into the turbine exhaust case 20 from the fuel injector assemblies. The fuel is ignited to provide additional thrust to the engine 10 as flow from the core engine mixes with the bypass flow B in the exhaust nozzle section 22 and is exhausted from the engine 10.

The turbine exhaust case 20 includes an exhaust duct, which, in this example, is a tied liner 38. In this example, the tied liner 38 extends axially from a position aligned with the vanes 34 to an aft end portion 40. The tied liner 38 includes a plurality of apertures 42. Fluid, such as air, from the bypass flow path B is selectively moved through the plurality of apertures 42 to cool the tied liner 38.

In this example, portions of the engine 10 downstream from the tied liner 38 are considered the nozzle section 22, which may include convergent flaps that move to direct flow from the engine.

Figure 4A:
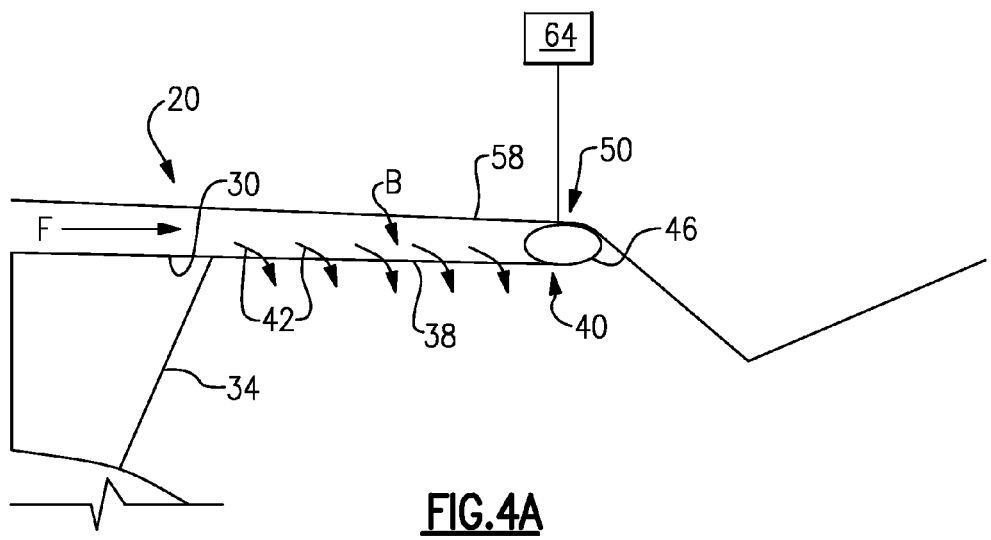
FIG. 4A shows a schematic section view of an example flow control device in a first position.
Figure 4B:
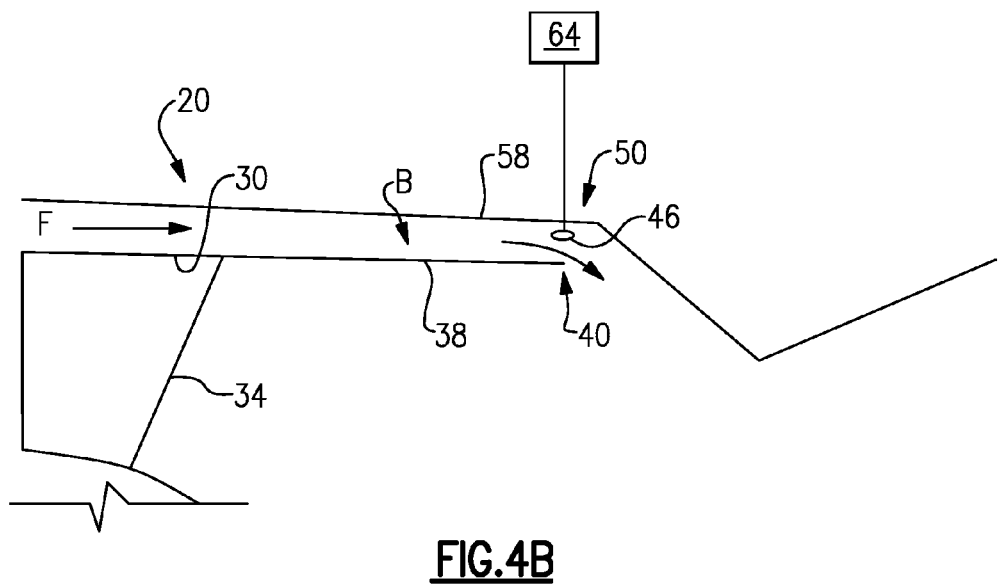
FIG. 4B shows a schematic section view of an example flow control device in a second position.

In this example, a flow control device 46 is moved between a first position (FIG. 4A) and a second position (FIG. 4B) to alter the amount of air that is moved through the tied liner 38 before entering the exhaust nozzle section 22.

The flow control device 46, in this example, is positioned radially between the aft end portion 40 of the tied liner 38 and an outer casing 58 of the engine 10. The flow control device 46, in this example, is positioned axially at an exit 50 of the bypass flow path B of the engine 10. Flow that moves through the exit 50 mixes with flow from the core engine within the exhaust nozzle section 22.

Although shown positioned at the exit 50, the example flow control device 46 could be located at other axial positions. For example, the flow control device 46 could be further forward, with some of the plurality of apertures 42 both upstream and downstream from the flow control device 46. In such axial positions, the flow control device 46 is axially spaced from the vanes 34 and a turbine exhaust case of the engine 10.

The flow control device 46 in the first position blocks more flow through the exit 50 than the flow control device 46 in the second position. In one example, the flow control device 46 permits no flow through the exit 50 when the flow control device 46 is in the first second position. In other examples, the flow control device 46 permits some flow through the exit 50 when the flow control device 46 is in the first position.

Permitting more flow through the exit 50 causes less flow to move through the plurality of apertures 42. Permitting less flow through the exit 50 causes more flow to move through the plurality of apertures 42, which increases cooling of the tied liner 38. When the engine 10 is operating in augmented mode, the flow control device 46 is moved to a first position so that more flow is moved through the plurality of apertures 42 and cooling is enhanced.

A controller 64 is operably coupled to the flow control device 46 in this example. The controller 64 is configured to automatically move the flow control device 46 between open and closed positions depending on cooling requirements of the tied liner 38, switching to an augmented flight mode, etc. The controller 64 is operated by a pilot in another example.

Many types of flow control devices could be used to selectively block flow through the exit 50 of the flow path 54. For example, the flow control device 46 could be an inflatable variable area device. The flow control device 46 could also be an arrangement of mechanical devices, such as a flap, that are pivotable back and forth across the flow path 54. In another example, the flow control device 46 includes a set of vanes. Some of the vanes are stationary and others circumferentially movable. The vanes are aligned to create openings for flow, or misaligned to block flow. In yet another example, the flow control device 46 is a series of vanes that pivot about their axes to open and close. In yet another example, the flow control device 46 translates axially to open a passage for flow or to close the passage.

Features of the disclosed examples include a flow control device that is located at a relatively downstream location. This location facilitates reduced signatures as the location is more shielded from a radar emitting device. This location also may facilitate thrust recovery.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A flow control device assembly for a turbomachine, comprising:
   a flow control device configured to move between a first position and a second position, the flow control device in the first position forcing more flow through a plurality of cooling holes than the flow control device in the second position, the plurality of cooling holes upstream the flow control device relative a direction of flow through the turbomachine, the plurality of cooling holes each having a fixed, non-variable cross-sectional area, the plurality of cooling holes disposed downstream from a fuel spraybar of an augmentor.

2. The flow control device assembly of claim 1, wherein the flow control device in the first position blocks more flow through an exit of a bypass flow path than the flow control device in the second position.

3. The flow control device assembly of claim 1, wherein the flow control device is positioned axially closer to an aft end of an exhaust duct than a forward end of the exhaust duct.

4. The flow control device assembly of claim 3, wherein the flow control device is positioned radially between the exhaust duct and an outer case of the turbomachine when moving between the first and second positions.

5. The flow control device assembly of claim 1, wherein the plurality of cooling holes are in an exhaust duct, and the plurality of cooling holes are all upstream the flow control device relative to a direction of flow through the turbomachine, wherein each of the plurality of cooling holes includes an outlet opening to and facing toward a rotational axis of the turbomachine.

6. The flow control device assembly of claim 5, wherein the exhaust duct includes an annular component that extends circumferentially continuously about an axis of the turbomachine, the plurality of cooling holes defined entirely within the annular component of the exhaust duct.

7. The flow control device assembly of claim 1, wherein the flow control device is axially spaced from a turbine exhaust case of the turbomachine.

8. The flow control device assembly of claim 1, wherein the flow control device is axially spaced from an axially rearmost vane of an exhaust section of the turbomachine.

9. The flow control device assembly of claim 1, wherein the flow control device is moveable to positions between the first position and the second position.

10. The flow control device assembly of claim 1, wherein the plurality of cooling holes each have a circular cross-sectional profile.

11. A turbomachine assembly, comprising:
an exhaust duct extending axially from an exhaust section of a turbomachine, the exhaust duct having a plurality of cooling holes each having a fixed and non-variable cross-sectional area, the plurality of cooling holes disposed downstream from a plurality of vanes of an augmentor, the vanes each housing a fuel spraybar; and
a flow control device at an aft end of the exhaust duct, wherein the flow control device is configured to move between a first position and a second position, the flow control device in the first position causing more air to move through the cooling holes than the flow control device in the second position.

12. The turbomachine assembly of claim 11, wherein the flow control device is spaced from an axially rearmost vane of an exhaust section of the turbomachine.

13. The turbomachine assembly of claim 11, wherein the flow control device is positioned radially between the exhaust duct and an outer case of the turbomachine.

14. The turbomachine assembly of claim 11, wherein the plurality of cooling holes are all upstream the flow control device relative to a direction of flow through the turbomachine, wherein each of the plurality of cooling holes includes an outlet opening facing toward a rotational axis of the turbomachine.

15. The turbomachine assembly of claim 11, wherein the flow control device is axially spaced from a turbine exhaust case of the turbomachine.

16. The turbomachine assembly of claim 11, wherein the plurality of cooling holes each have a round cross-sectional profile.

17. A method of selectively directing flow through cooling holes of an exhaust duct, comprising:
moving a flow control device from a first position to a second position to direct more flow through cooling holes of the exhaust duct, wherein the cooling holes are upstream the flow control device and downstream from a plurality of vanes of an augmentor, the vanes each housing a fuel spraybar, the cooling holes each having a fixed cross-sectional area that is not configured to vary during operation.

18. The method of claim 17, wherein moving the flow control device from the first position to the second position blocks flow.

19. The method of claim 17, wherein the flow control device is located within an aftmost portion of a bypass flowpath of a turbomachine having the exhaust duct.

20. The method of claim 17, wherein the cooling holes each have a round cross-sectional profile.

* * * * *